US012688262B2

(12) United States Patent
Yang

(10) Patent No.: US 12,688,262 B2
(45) Date of Patent: Jul. 21, 2026

(54) DEVICES, SYSTEMS, AND METHODS FOR EFFICIENTLY ENCRYPTING INFORMATION INTO A DIGITAL ASSET

(71) Applicant: Intelligent Racing Inc., San Ramon, CA (US)

(72) Inventor: Allen Y. Yang, San Ramon, CA (US)

(73) Assignee: Intelligent Racing Inc., San Ramon, CA (US)

( * ) Notice: Subject to any disclaimer, the term of this patent is extended or adjusted under 35 U.S.C. 154(b) by 77 days.

(21) Appl. No.: 18/366,126

(22) Filed: Aug. 7, 2023

(65) Prior Publication Data

US 2025/0053623 A1     Feb. 13, 2025

(51) Int. Cl.
*G06F 21/10* (2013.01)
*G06F 21/60* (2013.01)

(52) U.S. Cl.
CPC ........ *G06F 21/1065* (2023.08); *G06F 21/602* (2013.01)

(58) Field of Classification Search
CPC ............... G06F 21/602; G06F 21/1065; G06T 2201/0051; G06T 2201/0052; G06T 2201/0065; G06T 1/0028; G06T 1/0057; G06T 2201/005
See application file for complete search history.

(56) References Cited

U.S. PATENT DOCUMENTS

| | | | |
|---|---|---|---|
| 2011/0044537 A1* | 2/2011 | Cobb | G06F 18/23211 |
| | | | 382/165 |
| 2019/0121884 A1* | 4/2019 | Swaminathan | H03M 7/6088 |
| 2020/0267404 A1* | 8/2020 | Levy | H04L 9/3239 |
| 2021/0141585 A1* | 5/2021 | Prakash | G06F 16/9537 |
| 2023/0070586 A1* | 3/2023 | Kapur | G06Q 20/123 |
| 2024/0119128 A1* | 4/2024 | Li | H04L 63/0435 |
| 2024/0220966 A1* | 7/2024 | Alva | H04L 9/3239 |
| 2024/0221000 A1* | 7/2024 | Siu | G06F 21/16 |
| 2024/0223711 A1* | 7/2024 | Quinn | H04N 1/4446 |

FOREIGN PATENT DOCUMENTS

| | | | | |
|---|---|---|---|---|
| CN | 110838082 A | * | 2/2020 | G06T 1/005 |
| KR | 20230105669 A | * | 7/2023 | G06Q 50/12 |

OTHER PUBLICATIONS

Saleh, I. M., & Merzah, H. H. (2015). Efficient data hiding system using LZW cryptography and gif image steganography. International Journal of Technical Research and Applications, 3(2), 28-32. (Year: 2015).*

* cited by examiner

*Primary Examiner* — Mohammad A Siddiqi
(74) *Attorney, Agent, or Firm* — K&L Gates LLP

(57) ABSTRACT

A computer-implemented method of embedding information within a digital asset is disclosed herein. The method can include receiving a digital asset from a computer network, wherein the digital asset comprises a plurality of pixel values, embedding information within the digital asset by altering the plurality of pixel values, compressing the digital asset with the embedded information, generating an altered digital asset based on the compressed digital asset with the embedded information, and transmitting the altered digital asset to a computing device configured to retrieve the embedded information from the altered digital asset.

18 Claims, 8 Drawing Sheets

700

702
Receive a digital asset from a blockchain network, wherein the digital asset comprises a plurality of pixel values 704
Encrypt the information via an encryption algorithm prior to embedding the information within the unaltered digital asset 706
Embed information within the digital asset by altering the plurality of pixel values 708
Compress the digital asset with the embedded information 710
Generate an altered digital asset based on the compressed digital asset with the embedded information

100

107

300

302

ECAN PIE PECAN PIE PECAN PIE PEC

304

300

302

ECAN PIE PECAN PIE PECAN PIE PEC

304

306

400

402

404

SOUP CRÈME DSDSDSDE TOMATES ┓

400

402

404

SOUP CRÈME DSDSDSDE TOMATES ┓

406

700

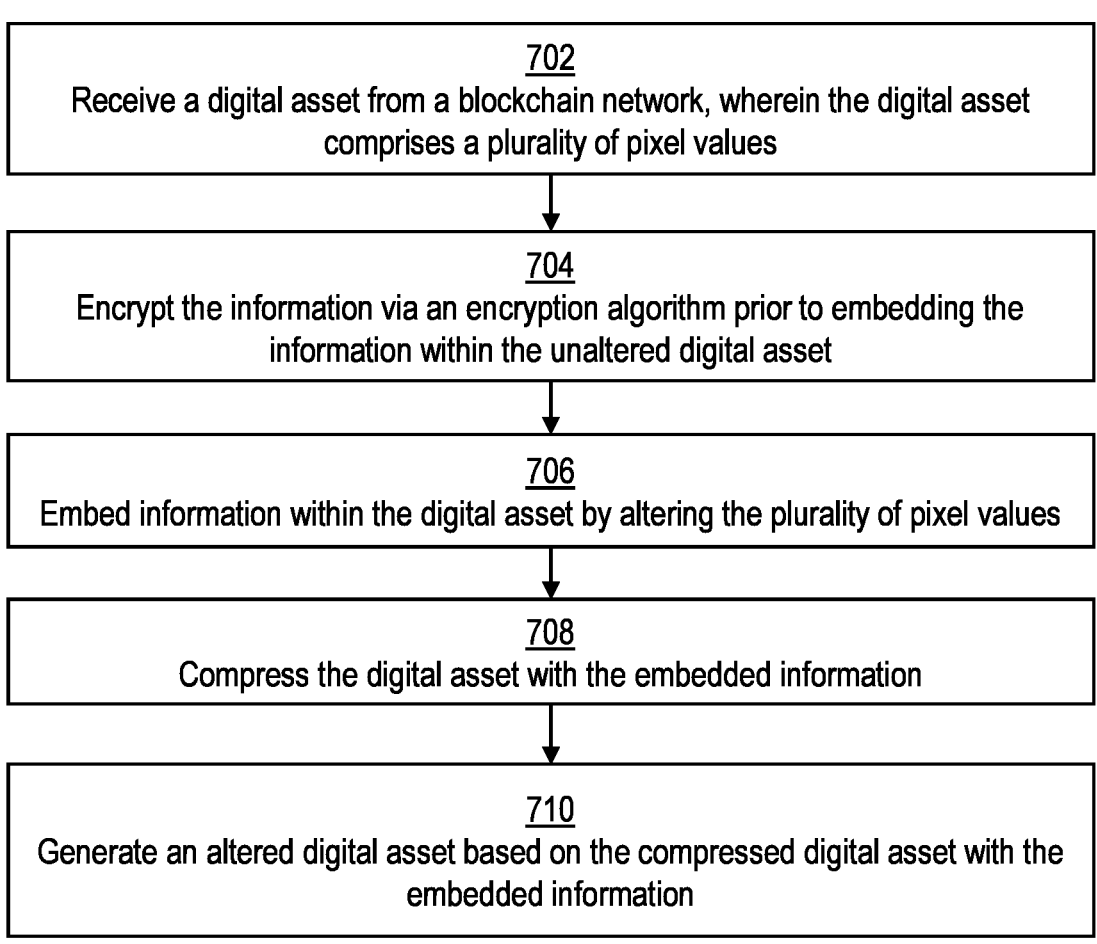

702
Receive a digital asset from a blockchain network, wherein the digital asset comprises a plurality of pixel values 704
Encrypt the information via an encryption algorithm prior to embedding the information within the unaltered digital asset 706
Embed information within the digital asset by altering the plurality of pixel values 708
Compress the digital asset with the embedded information 710
Generate an altered digital asset based on the compressed digital asset with the embedded information

FIG. 7

DEVICES, SYSTEMS, AND METHODS FOR EFFICIENTLY ENCRYPTING INFORMATION INTO A DIGITAL ASSET

TECHNICAL FIELD

The present disclosure is generally related encryption techniques and, more particularly, is directed to techniques to embed encrypted information into a digital asset without adversely affecting the aesthetic qualities of the asset, itself.

SUMMARY

In one aspect, the present disclosure provides a computer-implemented method of embedding information within a digital asset. The method can include receiving a digital asset from a computer network, wherein the digital asset comprises a plurality of pixel values, embedding information within the digital asset by altering the plurality of pixel values, compressing the digital asset with the embedded information, generating an altered digital asset based on the compressed digital asset with the embedded information, and transmitting the altered digital asset to a computing device configured to retrieve the embedded information from the altered digital asset.

In one aspect, the present disclosure provides a system for embedding information within a digital asset. The system can include a computing device including a processor and a memory that stores an application, and a host server including a processor and a memory to store instructions that, when executed by the processor, cause the host server to receive a digital asset from a computer network, wherein the digital asset includes a plurality of pixel values, embed information within the digital asset by altering the plurality of pixel values, compress the digital asset with the embedded information, and generate an altered digital asset based on the compressed digital asset with the embedded information, wherein, upon detection of the altered digital asset, the application causes the processor of the computing device to retrieve the embedded information from the altered digital asset upon receipt.

In one aspect, the present disclosure provides a computer-implemented method of utilizing information embedded within a digital asset. The method can include receiving a digital asset from a computer network, wherein the digital asset includes a plurality of pixel values. The method can further include detecting, via a computing device, that at least a subset of the plurality of pixel values that has been altered, comparing, via the computing device, the subset of the plurality of pixel values that has been altered to a codebook associated with an original color palette of the digital asset, extracting, via the computing device, embedded information from the digital asset based on the comparison of the subset of the plurality of pixel values to the codebook, and executing, via the computing device, a predetermined action based on the embedded information extracted from the digital asset.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

FIG. 7 illustrates a logic flow diagram of a method of efficiently encrypting information into a dynamic, digital asset, according to at least one non-limiting aspect of the present disclosure.

Corresponding reference characters indicate corresponding parts throughout the several views. The exemplifications set out herein illustrate various aspects of the invention, in one form, and such exemplifications are not to be construed as limiting the scope of the invention in any manner.

DESCRIPTION

Figure 1:
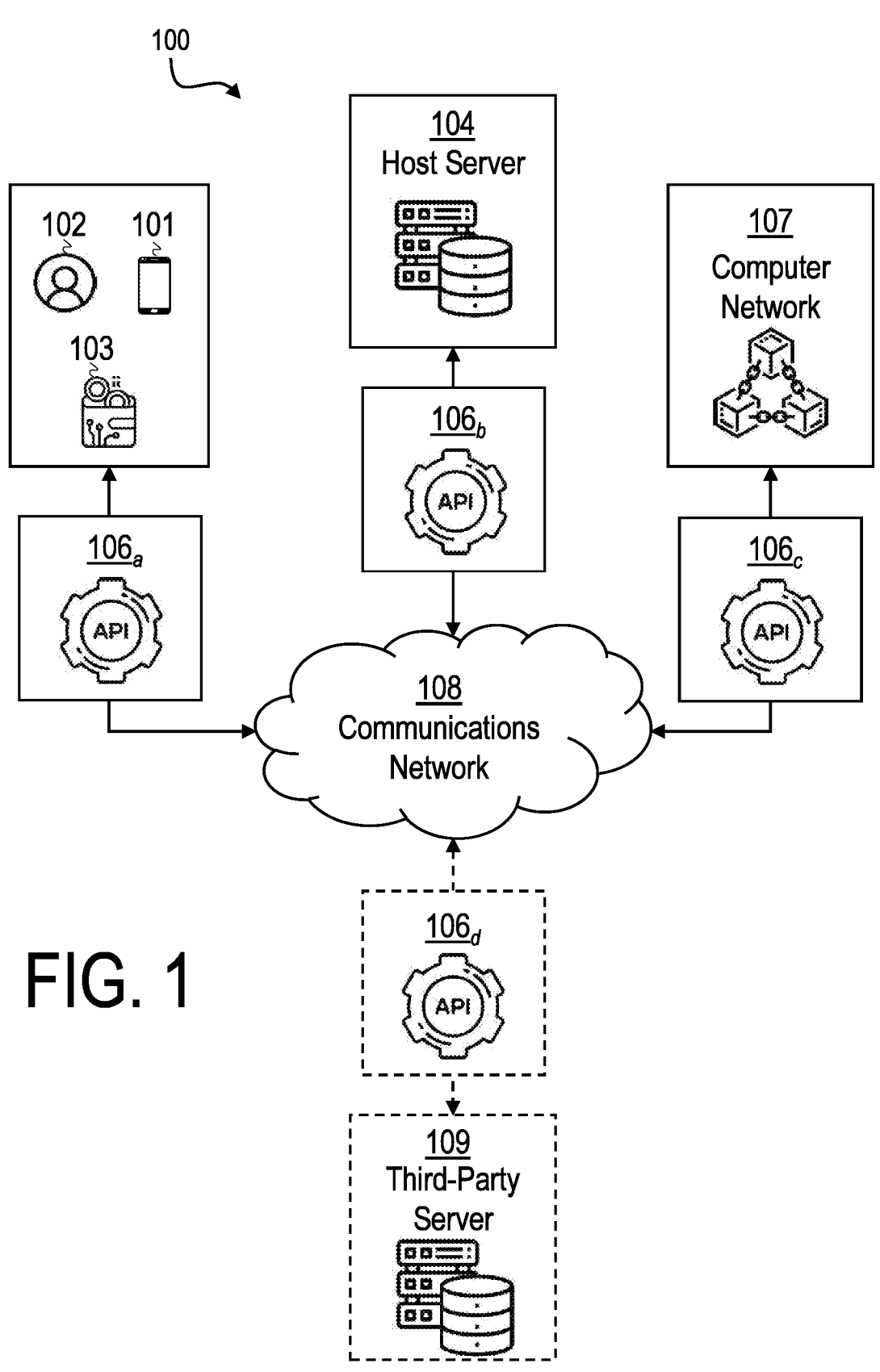
FIG. 1 illustrates a block diagram of a system configured to efficiently encrypt information into a dynamic, digital asset, according to at least one non-limiting aspect of the present disclosure.

The following disclosure may provide exemplary systems, devices, and methods for encrypting information into a dynamic, digital asset. However, although specific reference may be made to such various means of encrypting information, file types, and asset layouts, it shall be appreciated that such aspects are merely illustrative and thus, shall not be construed as limiting. Accordingly, it shall be appreciated that, according to other non-limiting aspects, comparable means of encrypting information, file types, and asset layouts can be implemented by the systems, devices, and methods contemplated by the present disclosure to achieve a similar effect.

Before discussing specific aspects, or examples, some descriptions of terms used herein are provided below.

An "application" may include any software module configured to perform a specific function or functions when executed by a processor of a computer. For example, a "mobile application" may include a software module that is configured to be operated by a mobile device. Applications may be configured to perform many different functions. For instance, a "payment application" may include a software module that is configured to store and provide account credentials for a transaction. A "wallet application" may include a software module with similar functionality to a payment application that has multiple accounts provisioned or enrolled such that they are usable through the wallet application. Further, an "application" or "application program interface" (API) refers to computer code or other data sorted on a computer-readable medium that may be executed by a processor to facilitate the interaction between software components, such as a client-side front-end and/or serverside back-end for receiving data from the client. An "interface" refers to a generated display, such as one or more graphical user interfaces (GUIs) with which a user may interact, either directly or indirectly (e.g., through a keyboard, mouse, touchscreen, etc.).

The terms "client device" and "user device" refer to any electronic device that is configured to communicate with one or more servers or remote devices and/or systems. A client device or a user device may include a mobile device, a network-enabled appliance (e.g., a network-enabled television, refrigerator, thermostat, and/or the like), a computer, a POS system, and/or any other device or system capable of communicating with a network. A client device may further include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a point of sale (POS) system, and/or any other device, system, and/or software application configured to communicate with a remote device or system.

As used herein, the term "communication" and "communicate" may refer to the reception, receipt, transmission, transfer, provision, and/or the like of information (e.g., data, signals, messages, instructions, calls, commands, and/or the like). A communication may use a direct or indirect connection and may be wired and/or wireless in nature. As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. For example, a first unit may be in communication with a second unit even though the first unit passively receives data and does not actively transmit data to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting aspects, a message may refer to a packet (e.g., a data packet, a network packet, and/or the like) that includes data. It will be appreciated that numerous other arrangements are possible.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an aspect, but other elements may be added and still form a construct within the scope of a claim. In contrast, the transitional phrase "consisting of" excludes any element, step, or ingredient not specified in a claim. This is consistent with the use of the term throughout the specification.

As used herein, the term "computing device" or "computer device" may refer to one or more electronic devices that are configured to directly or indirectly communicate with or over one or more networks. A computing device may be a mobile device, a desktop computer, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to send, receive, process, and/or output data, and normally includes a display device, a processor, a memory, an input device, a network interface, and/or the like.

Recently, general interest in digital assets, including assets associated with non-fungible tokens, has increased. A non-fungible token, for example, is a token stored on a digital ledger maintained by a computer network, which can be sold and traded. non-fungible tokens represent ownership of unique items, such as digital assets that include art, collectibles, or even real estate. Ownership of a non-fungible token can be immutable and authenticated via the computer network. This provides significant value to digital artists, whose artwork may take the form of a digital file that can be easily duplicated and dispersed across the Internet. Unlike art embodied in physical media, it was difficult to establish verifiable ownership of digital artwork prior to the emergence of non-fungible tokens. Accordingly, many digital artists have begun "minting" (e.g., creating digital assets on a blockchain) non-fungible tokens associated with their art to establish a verifiable right of ownership in their original, digital artwork. The emergence of non-fungible tokens has thus created new digital markets for digital assets, including art and collectibles, gaming and gaming assets, event ticketing, and/or virtual real estate, amongst others.

The number of applications for non-fungible tokens is rapidly growing. This growth, however, may be technologically hindered by the lack of functionality provided by conventional digital assets. For example, non-fungible tokens are presently used to authenticate the ownership of conventional virtual goods, which are subjectively-valued appreciated for their aesthetic qualities. Examples of such digital assets include digital art (e.g., Bored Apes Yacht Club), virtual card games (e.g., Splinterlands, Skyweaver), online collectibles (e.g., Sorare, NBA Top Shot, NFL All Day), and virtual apparel (e.g., RTFKT Studios, DRESSX). However, some applications for non-fungible tokens and digital assets may call for the storage and/or encryption of information within a virtual assert associated with a non-fungible token. This could enable an implementing user to store encrypted and/or executable information within a non-fungible token, which could be read by a specifically-configured application via a computing device. The aesthetic nature of conventional digital assets is clearly important, which makes it difficult to include information into the digital asset. Even if an implementing user were to compromise the aesthetics of a conventional digital asset by printing encrypted and/or executable information, they would be faced with an issue of efficiency. This is because some applications may call for a cumbersome amount of information to be embedded within the digital asset, which would either consume most or all of the "real estate" provided by the digital asset or limit the amount of information a conventional digital asset could store. Accordingly, there is a need for devices, systems, and methods for efficiently encrypting information into a dynamic, digital asset. Additionally, such devices, systems, and methods must be compatible with one or more data compression schemes to prevent the destruction of embedded information after compression of image data, animations, audio data, and/or video data associated with digital assets. By securely embedding and/or encrypting information into digital assets, the devices, systems, and methods disclosed herein can imbue digital assets with enhanced functionality that provides tangible, practical improvements for various applications, including gaming and/or generative artificial intelligence ("AI").

As such, it shall be appreciated that the devices, systems, and methods disclosed herein are particularly configured to present technological solutions (e.g., increased functionality via executable information embedded within a digital asset, more efficient conveyance of information, less aesthetically intrusive storage of information, encrypted means of conveying information securely, etc.) to the aforementioned technological problems presented by conventional digital assets and non-fungible tokens. Additionally, the devices, systems, and methods disclosed herein utilize less computational resources, while enhancing the functionality of conventional digital assets and non-fungible tokens. For example, the devices, systems, and methods disclosed herein can utilize a graphics interchange format (commonly known as GIF) that can support up to 8 bits per pixel, or more, for each image. This allows a single image to reference its own palette of up to 256 different colors, or more, chosen from the typical 24-bit RGB color space. Graphics interchange format files, for example, can support multi-frame animations that allow for a separate palette of up to 256 colors for each frame. The devices, systems, and methods disclosed herein can employ the frame-by-frame palettes afforded by graphics interchange format files to alter pixel values from an original file at a pre-defined set of coordinates. The devices, systems, and methods disclosed herein then utilize the altered pixel values to efficiently embed useful data information within a digital asset associated with a non-fungible token. As will be described herein, the graphics interchange format files can be compressed via a deterministic compression and thus, easily deciphered via an application executed by a computing device. This enables a relatively large amount of information to be embedded within multiple frames of a digital asset associated with a non-fungible token in an efficient compressible means that will not overburden a receiving computing device, especially when compared to conventional digital assets. Accordingly, the devices, systems, and methods of the present disclosure practically integrate the encryption techniques disclosed herein into digital assets associated with non-fungible tokens that are more informative, functional, and/or interactive when compared to conventional digital assets associated with conventional non-fungible tokens. The devices, systems, and methods disclosed herein improve such conventional technologies and provide practical, tangible results that are otherwise unavailable to developers.

Referring now to FIG. 1, a block diagram of a system 100 configured to efficiently encrypt information into a digital asset, which can be static or dynamic, is depicted according to at least one non-limiting aspect of the present disclosure. It shall be appreciated that there are many possible configurations for the systems configured to achieve a similar result as the system 100 of FIG. 1 and thus, the present disclosure contemplates other systems that include fewer or more entities, each of which may perform some or all of the tasks of the others, and may be owned or operated by various entities. As such, the specific architecture of the system 100 of FIG. 1 is illustrative and may be modified to achieve a similar functional result. Likewise, it shall be appreciated that communications between various components of the system 100 of FIG. 1 can be bi-directional, meaning information can be exchanged to and from each component.

According to the non-limiting aspect of FIG. 1, the system 100 can include a computing device 101 of a consuming user 102, a host server 104, and a computer network 107 configured to access, receive, transmit, and/or host digital assets. According to some non-limiting aspects, the computer network 107 can include a blockchain network configured to host digital assets via attributions to non-fungible tokens. The computing device 101, host server 104, and computer network 107 can be communicably coupled via a communication network 108, which can include any suitable wireless communication technology. For example, according to various aspects, the wireless communication module 32 can employ a number of wireless communication standards or protocols, including but not limited to Wi-Fi (IEEE 802.11 family), WPA2, WPA3, WiMAX (IEEE 802.16 family), IEEE 802.20, long-term evolution (LTE), and Ev-DO, HSPA+, HSDPA+, HSUPA+, EDGE, GSM, GPRS, CDMA, TDMA, DECT, and Ethernet derivatives thereof, as well as any other wireless protocols that are designated as 3G, 4G, 5G, Bluetooth, Z-Wave, Thread, and/or ZigBee, amongst others. However, according to other non-limiting aspects, the computing device 101, host server 104, and/or computer network 107 can be configured to communicate via a wired protocol, including an Ethernet connection, a local area network, RS-232, RS-485, UART, and/or USB, amongst others.

Additionally, the system 100 can deploy one or more application programming interfaces ("APIs") 106a-d configured to enable communication between various applications deployed by the various components of the system 100, such as the computing device 101, the host server 104 and/or the computer network 107. For example, the one or more APIs 106a-d can be stored in a memory of the computing device 101, the host server 104 and/or a node of the computer network 107 and, along with instructions also stored in the memory, can cause a processor of the computing device 101, the host server 104 and/or a node of the computer network 107 to communicate with each other and perform the methods disclosed herein. For example, via the one or more APIs 106a-d, the computing device 101, the host server 104 and/or the computer network 107 can initiate API calls, which may include information and requests that can be received, processed and/or resolved on the consuming user's 102 behalf by the other components of the system 100. According to some non-limiting aspects, the one or more APIs 106a-d can facilitate communication with one or more third party servers 109, which can provide the system 100 with third party services or products (e.g., cryptocurrency exchanges, data repositories, etc.).

In further reference to FIG. 1, the computer network 107 can be configured to host a digital asset, as will be explained in further detail with reference to FIG. 2. For example, the digital asset can include a multimedia file, such as an image, an audio file, and/or a video file, amongst other files. In other words, the digital asset may be referred to as a "non-fungible token asset" because it has been tokenized, with the resulting token being managed by a ledger 210 (FIG. 2) hosted by the computer network 107. Thus, exclusive ownership of the non-fungible token asset can be verified via the computer network 107, functioning as a decentralized blockchain, which makes buying, selling, and trading ownership of the non-fungible token asset verifiable and more secure. The host server 104 can receive the digital asset directly from the computer network 107 or, according to some non-limiting aspects, indirectly from the computer network 107 via the third-party server 109. According to still other non-limiting aspects, the host server 104 can either generate or receive the digital asset (e.g., multimedia file) before it is minted as a non-fungible token and published on the ledger 210 (FIG. 2) hosted by the computer network 107. It shall be appreciated, therefore, that the host server 104 can be particularly configured to perform the methods disclosed herein to embed information within existing digital assets or to generate new digital assets that contain embedded information.

According to some non-limiting aspects, digital assets generated by the host server 104 of FIG. 1 can include a graphics interchange format that includes a plurality of pixel values defined via a finite color palette. For example, the format may support up to 8 bits (e.g., one byte) per pixel for each digital asset, allowing a single image to reference its own palette of up to 256 different colors chosen from a 24-bit RGB color space. As will be described in further detail herein, the host server 104 can embed information into the digital asset by altering one or more pixel values of the plurality of pixel values. In summary, the host server 104 can be configured to specifically alter the plurality of pixels of the digital asset such that the altered pixels represent information that an implementing user wants to embed within the digital asset. The original, finite color palette of the unaltered digital asset can function as a "codebook" employed by an application 103 stored in a memory of the computing device 101. According to some non-limiting aspects, the application 103 can include a digital wallet configured to access and manage digital assets, a video game, a multimedia player, a digital wallet configured to access and manage digital assets, and/or any other application capable of detecting or otherwise receiving information embedded within the digital asset. The application 103 can be particularly configured to decode information embedded within the digital asset based on the altered pixel values.

As will be described in further detail with reference to FIGS. 3 and 4, the host server 104 of the system 100 of FIG. 1 can embed information within the digital asset by altering the pixels while preserving a desired aesthetic quality of the digital asset. For example, an unaltered digital asset may include one or more portions the implementing user does not want to alter, for example, an artistic component (e.g., a portion of the digital asset deemed digital art created by a digital artist, etc.). Accordingly, the implementing user may provide the host server 104 with predetermined coordinates of pixel values to be altered and predetermined coordinates of pixel values not to be altered. The predetermined coordinates of pixel values to be altered may not overlap with the artistic component. Contrarily, the predetermined coordinates of pixel values the implementing user does not want to alter may include pixel values that comprise at least a portion of the artistic component. As such, the host server 104 of the system 100 of FIG. 1 can be configured to intentionally embed information into desired portions of the digital asset by exclusively altering pixel values at desired predetermined coordinates, while leaving pixel values that comprise at least a portion of the artistic component alone. The system 100, therefore, can preserve the aesthetic nature of digital assets, while embedding the digital asset with information that can be used to enhance the functionality of the digital asset, as will be described in further detail herein.

The host server 104 of the system 100 of FIG. 1 can further compress the digital asset, including any embedded information via pixel alteration, without compromising the information embedded within the digital asset. Generally, conventional devices, systems, and methods of generating digital assets experience a certain degree of loss of data fidelity via commonly employed compression processes, such as joint photographic experts group, moving pictures experts group, and advanced video coding, or H.264, methods of compression. For example, "compression" usually means exactly that, the compression and therefore, inherent loss of information associated with conventional digital assets, especially those presented in other formats, such as a joint photographic expert group format, or a moving picture expert group format. Even if information were embedded within a raw format of a conventional digital asset, that information could be irreparably lost upon compression. However, because the host server 104 of the system 100 generates digital assets with a plurality of pixel values defined via a finite color palette, there is only one way to compress the digital asset from its raw format and all of its data, including information embedded via pixel alteration, is preserved. This "deterministic" compression process can reduce uncertainties and completely eliminate the risk of data loss due to the compression. However, in spite of the reduced uncertainty and risk of loss, the host server 104 still produces lightweight digital assets that are efficient for a variety of uses. This is because the host server 104 alters pixel values of the digital asset without altering the original color palette of the unaltered digital asset. Although the altered virtual assert can include more information, the file size of the altered digital asset remains roughly the same in terms of the file size of the original digital asset. This can be particularly useful for applications wherein the computing device includes a mobile computing device, such as a smartphone.

According to some non-limiting aspects, the host server 104 of the system 100 of FIG. 1 can encrypt the information prior to embedding it within the digital asset. This can be accomplished via an encryption algorithm stored in a memory of the host server 104 prior to embedding the information within the unaltered digital asset. For example, the encryption algorithm can employ a symmetric encryption algorithm (e.g., Fernet, etc.) that utilizes a single, typically private key, or an asymmetric encryption algorithm (e.g., the Rivest-Shamir-Adleman or RSA, etc.) that utilizes a public and private key pair. In symmetric encryption, the sender and receiver need to agree on a private key that is not publicly known to third party in order to protect the privacy of the data. However, in asymmetric encryption, a sender can encrypt the data using the recipient's public key, but only the recipient can decrypt the data via the use of a private key held exclusively by the recipient.

Once the digital asset is detected or otherwise received via the application 103 of the computing device 101, the embedded information can be decrypted using an decryption key stored on or otherwise accessed by the computing device 101. As such, even if a public user can determine that the digital asset has been altered and suspects that information may be embedded within the pixel values of the digital asset, the embedded information remains secure and resilient to unauthorized decryption, because the encryption is computationally infeasible to reverse without the decryption key.

Still referring to the non-limiting aspect of FIG. 1, after the host server 104 has effectively generated an altered digital asset that includes embedded information via the aforementioned pixel alteration process, the host server 104 can either transmit the altered digital asset to the computing device 101 or to the computer network 107 acting as a decentralized blockchain for minting and storage as a non-fungible token. The computing device 101, via the application 103, can be configured to detect or otherwise receive the digital asset from either the host server 104, the computer network 107, or the third-party server 109. According to some non-limiting aspects, information embedded within the digital asset can be machine-readable, meaning the computing device 101 can decode the embedded information upon receipt of a transmission including the digital asset from the host server 104, the computer network 107, or the third-party server 109. However, according to other non-limiting aspects, the information embedded within the digital asset can be visually decipherable by the computing device 101 and thus, the application 103 may utilize an imaging device (such as a camera) of the computing device 101 to detect and decode the embedded information within the digital asset. In other words, according to some non-limiting aspects, the computing device 101 only needs to receive the digital asset via the communications network 108 and, according to other non-limiting aspects, the computing device 101 can scan the digital asset via an imaging device. As previously discussed, according to non-limiting aspects, at least a portion of the information has been encrypted prior to being embedded within the digital asset. Accordingly, detection or receipt of the digital asset is not enough to decode the information. The encryption can only be reversed with a decryption key, which may be stored in a memory of the computing device 101 or otherwise accessed by the consuming user 102. For example, if the encryption is symmetric, only the sender and recipient may possess the decryption key. In an asymmetric encryption scheme, only the receiver may possess the decryption key.

According to some non-limiting aspects, digital assets generated by the system 101 of FIG. 1 can include embedded information that is actionable upon decoding and/or decryption. This can technologically enhance the use of digital assets, providing new functionality and use cases that conventional digital arts, devices, systems, and methods were incapable of providing. Specifically, information embedded within the digital asset can cause the application 103 to cause the computing device 101 to perform a predetermined action upon retrieval of the digital asset. According to some non-limiting aspects, predetermined actions can performed by the computing device 101 in conjunction with the third party server 109, as will be explained in further detail herein. For example, according to some non-limiting aspects, the application can include a video game, metaverse, or another augmented or virtual environment and the digital asset can include an image of a video game asset, such as an item, a weapon, an article of clothing, a skin, and/or a playable character. Upon decoding and/or decrypting the information embedded, the digital asset can cause the application 103 to access the video game asset for use in the application 103. For example, according to some non-limiting aspects, information embedded within the digital asset can include the video game asset and, upon detection and/or receipt of the digital asset, the application 103 can retrieve the video game asset from the embedded information (e.g., the two-dimensional or three-dimensional model, visual appearance, and/or gaming attributes). According to other non-limiting aspects, the video game asset can be inherent to the application 103 and the instructions can merely unlock access to the video game asset. However, according to other non-limiting aspects, the video game asset can be stored on the third-party server 109 or the host server 104 and the embedded instructions can merely instruct the application 103 to cause the computing device 101 to retrieve the video game asset from the third-party server 109 or the host server 104.

According to other non-limiting aspects, the digital asset can include an image file associated with a musical composition (e.g., a song, composition, or album), such as an album cover. Upon decoding and/or decrypting the embedded information, the digital asset can cause the application 103 to cause the computing device 101 to access and/or play an audio file (e.g., at least a portion of the song, composition, or album) associated with the musical composition upon retrieval of the information embedded within the digital asset. For example, according to some non-limiting aspects, information embedded within the digital asset can include the audio file and, upon detection and/or receipt of the digital asset, the application 103 can retrieve the audio file from the embedded information. According to other non-limiting aspects, the audio file can be inherent to the application 103 and the instructions can merely unlock access to the audio file. However, according to other non-limiting aspects, the audio file can be stored on the third-party server 109 or the host server 104 and the embedded instructions can merely instruct the application 103 to cause the computing device 101 to retrieve the audio file from the third-party server 109 or the host server 104.

According to other non-limiting aspects, the digital asset can include an image of food. Upon decoding and/or decrypting the embedded information, the digital asset can cause the application 103 to cause the computing device 101 to access and/or display a recipe and/or nutritional information associated with the food in the image. For example, according to some non-limiting aspects, information embedded within the digital asset can include the recipe and/or nutritional information and, upon detection and/or receipt of the digital asset, the application 103 can retrieve the recipe and/or nutritional information from the embedded information. According to other non-limiting aspects, the recipe and/or nutritional information can be inherent to the application 103 and the instructions can merely unlock access to the recipe and/or nutritional information. However, according to other non-limiting aspects, the recipe and/or nutritional information can be stored on the third-party server 109 or the host server 104 and the embedded instructions can merely instruct the application 103 to cause the computing device 101 to retrieve the recipe and/or nutritional information from the third-party server 109 or the host server 104.

According to other non-limiting aspects, the digital asset can be embedded with payment information, such as an account number, a routing number, a pin number, an account balance, and/or a wire number. Upon decoding and/or decrypting the embedded information, the digital asset can cause the application 103 to cause access and/or display the payment information embedded within the digital asset, or initiate a transaction based on the payment information embedded within the digital asset.

According to still other non-limiting aspects, the system 100 of FIG. 1 can embed information in digital assets that, upon decoding and/or decrypting the embedded information, can enable a transformative, interactive experience for the consuming user 102. For example, the system 100—and more specifically, the host server 104—can embed information within the digital asset that either defines or enables a generative artificial intelligence algorithm and/or model. As used herein, the term "generative artificial intelligence" shall include a model built on a plurality of parameters or coefficients that define the generation of outputs based on inputs provided by the consuming user 102 via the computing device 101, in cooperation with a data repository. According to some non-limiting aspects, the information embedded within the digital asset can itself, define the generative artificial intelligence. However, for more expansive applications, a more sophisticated generative artificial intelligence and/or data repository accessed by the generative artificial intelligence can be stored on the third party server 109 or the host server 104 to preserve the lightweight nature of the digital asset. As such, information embedded within the digital asset may simply provide an interface and thus, facilitate interactions, with the generative artificial intelligence, which can be stored remotely. Upon decoding and/or decrypting the embedded information, the digital asset can cause the application 103 to cause the computing device 101 to commence an interactive experience between the consuming user 102 and the generative artificial intelligence, for example, by prompting an input from the consuming user 102 via the computing device 101. For example, the generative artificial intelligence algorithm and/or model can provide interaction and services via generative, two-dimensional and three-dimensional visualizations (e.g., stable diffusion and/or deep fake technologies) and/or generative conversational language assets (e.g., generative pre-trained transformers (GPT) models).

It shall be appreciated that the generative artificial intelligence, for example, can be customized for a consuming user 102 based on inputs provided by the consuming user 102. For example, the consuming user 102 may upload text, images, and/or video associated with their grandmother to the host server 104 of the system 100 of FIG. 1. Based on theses user inputs, the host server 104 may generate a model that includes plurality of parameters or coefficients associated with the grandmother, as well as a data repository associated with the grandmother. The host server 104 can further generate a digital asset that includes a picture of the grandmother and, using the methods disclosed herein, can embed information, including the generated model and/or the data repository, within the digital asset. Accordingly, the host server 102 can transmit the generated digital asset back to the computing device 101. Upon decoding and/or decrypting the embedded information, the digital asset can cause the application 103 to cause the computing device 101 to commence an interactive experience between the consuming user 102 and the generative artificial intelligence, which was customized based on the user inputs associated with the grandmother. The digital asset, in other words, can facilitate a conversation (e.g., via text, audio, video, etc.) between the consuming user 102 and their grandmother. Of course, the generative artificial intelligence can be produced based on any user inputs and thus, can simulate any fictional or non-fictional personality, character, or creature, according to user preference or intended application.

Figure 2:
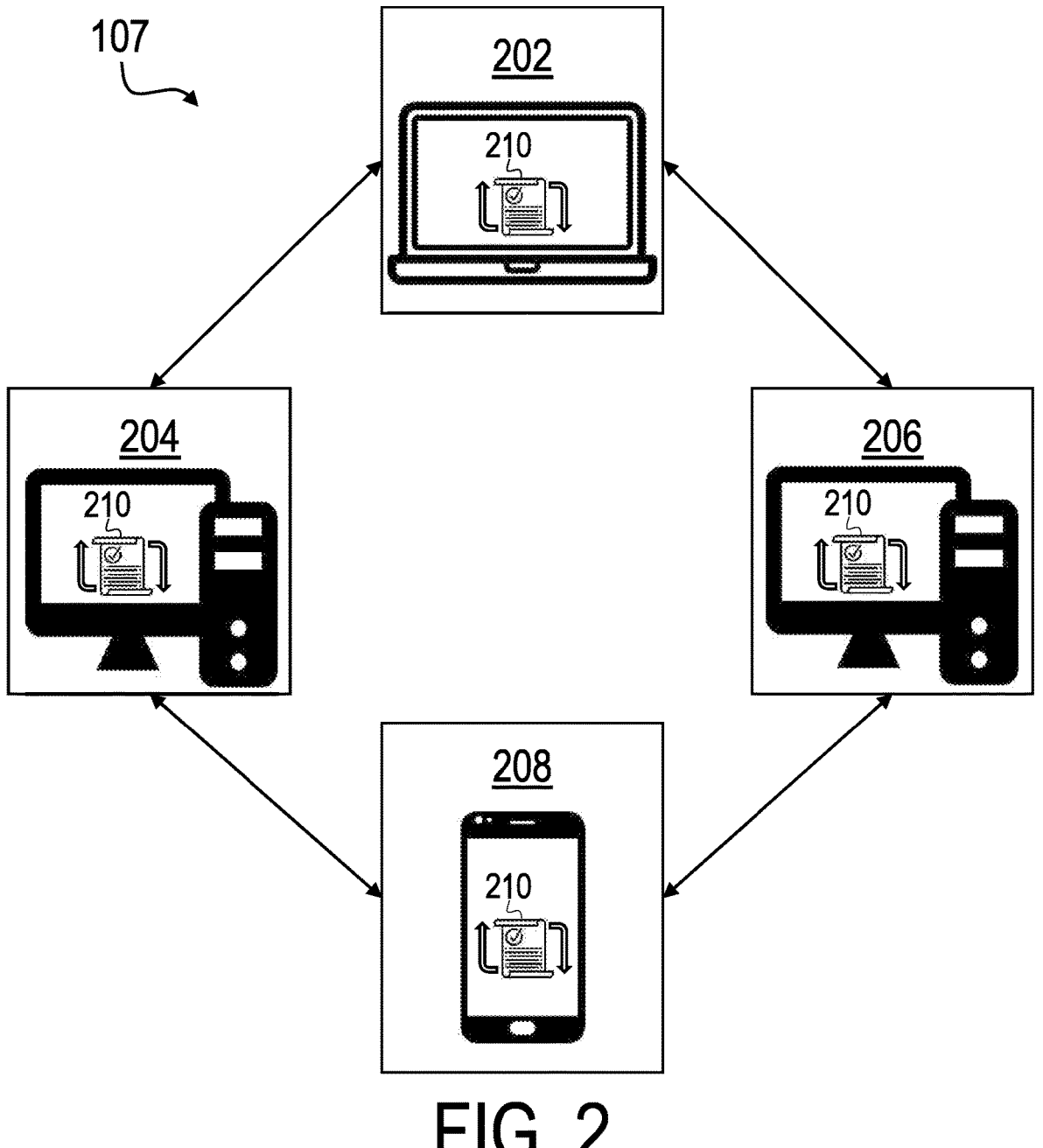
FIG. 2 illustrates a block diagram of a decentralized system configured to interface with the system of FIG. 1, according to at least one non-limiting aspect of the present disclosure.

Referring now to FIG. 2, a block diagram of the computer network 107 configured to interface with the system 100 of FIG. 1 is depicted according to at least one non-limiting aspect of the present disclosure. According to the non-limiting aspect of FIG. 2, the computer network 107, acting as a decentralized blockchain, can include one or more nodes 202, 204, 206, 208 configured to interact with each other such that the nodes 202, 204, 206, 208 can host, modify, and verify a ledger 210, which the nodes 202, 204, 206, 208 of the computer network 107 mange by consensus. In other words, according to some non-limiting aspects, the computer network 107 can be configured as a decentralized blockchain. In a distributed fashion, all nodes 202, 204, 206, 208 use a blockchain consensus algorithm to agree on the authenticity of the majority of all the ledger 210 copies, or from time to time reject a minority of the ledger 210 copies as non-authentic.

According to the non-limiting aspect of FIG. 2, the computer network 202 can include one or more laptop computers 202, personal computers 204, servers 206, and/or mobile computing devices 208, such as a smart phone and/or a tablet. However, it shall be appreciated that the non-limiting aspect of FIG. 2 is merely illustrative. As such, the computer network 107 can include any number and/or type of nodes 202, 204, 206, 208 necessary to effectively host, modify, and verify a ledger 210. Moreover, certain privileges associated with the ledger 210 can be selectively allocated to certain nodes 202, 204, 206, 208 of the computer network 107. For example, most nodes may be configured only to verify or validate the ledger 210, while a select number of nodes may have the ability to modify the ledger 210 and/or generate new blocks.

According to the non-limiting aspect of FIG. 2, the ledger 210 can include records of transactions conducted between accounts associated with the computer network 107. For example, the ledger 210 can include records associated with transactions executed via smart contracts, or code that automatically executes all components of an agreement that is then stored in the ledger 210. The code itself can be replicated across the multiple nodes 202, 204, 206, 208 of a computer network 107 and, therefore, the ledger 210 and its records benefit from the security, permanence, and immutability provided by the blockchain 107. Notably, the computer network 107 can also include any foundational, "layer two," or tributary chain, including chains such as the Bitcoin blockchain, Ethereum, Polygon, Arbitrum, Optimism, and/or Loopring, amongst others.

In further reference to FIG. 2, the nodes 202, 204, 206, 208 can provide a blockchain service to the computing device 101 (FIG. 1) by performing behaviors that are determined in a decentralized fashion via the aforementioned consensus algorithms. For example, a blockchain service may include a transaction initiated by generating a cryptographically signed message and sending the message to computer network 107. The message can include transaction data such as information pertaining to an object of the transaction (e.g., a digital asset, a cryptocurrency, a non-fungible token, etc.), a recipient, and/or an amount associated with the transaction, amongst other information. Once a node 202, 204, 206, 208 receives the message, the node 202, 204, 206, 208 can distribute the message to the other nodes 202, 204, 206, 208 in the computer network 107.

According to some non-limiting aspects, each of the nodes 202, 204, 206, 208 of the computer network 107 can include the transaction represented in the generated message in a block of other transactions and can attempt to validate or cryptographically solve the block. The first node 202, 204, 206, 208 that solves the block can provide the solution to the other validation nodes for verification, and ledger 210 maintained at each of the nodes 202, 204, 206, 208 can be updated to add the block to the ledger 210 to effect the transaction. As an incentive to cryptographically solve blocks—which consumes electricity and computing resources—select nodes 202, 204, 206, 208 can earn at least a part of a token hosted on the ledger 210 (e.g., a cryptocurrency) and/or a fee for participating in the validation of the block.

As such, it shall be appreciated that the ledger 210—and more generally, the computer network 107—of FIGS. 1 and 2 can be used to track transactions and ownership of any number of digital assets, including non-fungible tokens. For example, an API call can include a unique identifier (e.g., a personal account number, etc.), as well as a public key and/or a private key, amongst other cryptographic information that can be used to identify, receive, and/or verify ownership of a non-fungible token hosted on the computer network 107. Having received the API call from the computing device 101 (FIG. 1) or the host server 104 (FIG. 1), the non-fungible token can be located on the computer network 107. Every public key matches to only one private key and thus, exclusive ownership of the non-fungible token and thus, the non-fungible token asset, can only be verified using the provided private key. In other words, anyone can locate wallets and send transactions to an address associated with a public key, but only the private key can unlock the asset and verify the owner as recipient of the assert received in the last transaction recorded in the ledger 210. Upon receipt, for example, the host server 104 can embed information within the digital asset and/or compress the digital asset, as previously described. Alternately, the host server 104 can generate a new digital asset, embed information within the newly created digital asset, and/or compress the newly created digital asset, as previously described, and "mint" a new non-fungible token via the computer network 107.

Figure 3A:
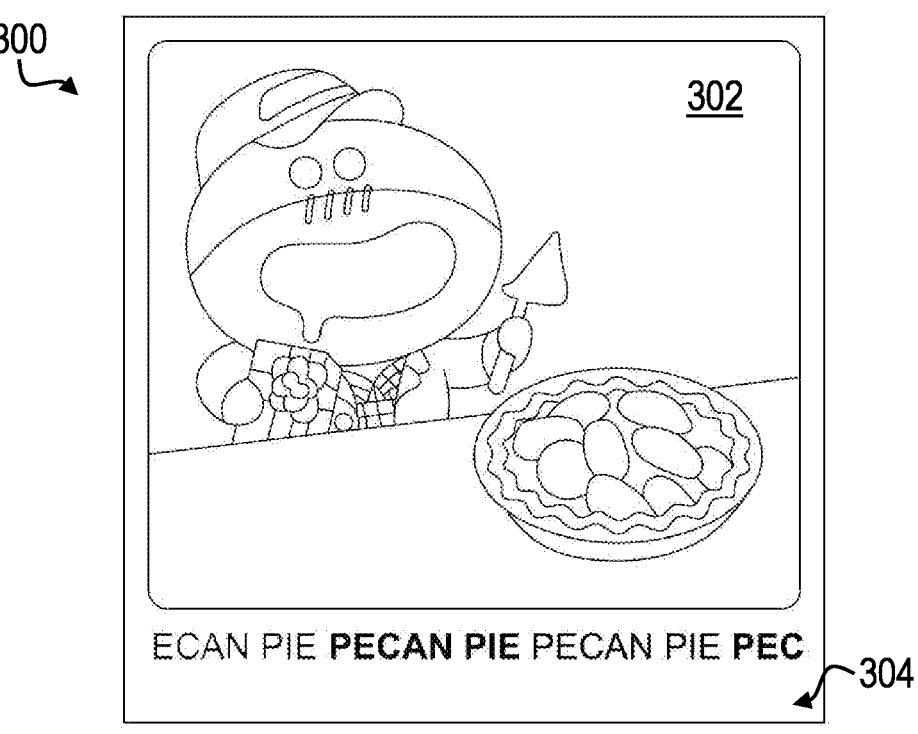
FIGS. 3A and 3B illustrate a digital asset generated by the system of FIG. 1, according to one non-limiting aspect of the present disclosure.
Figure 3B:
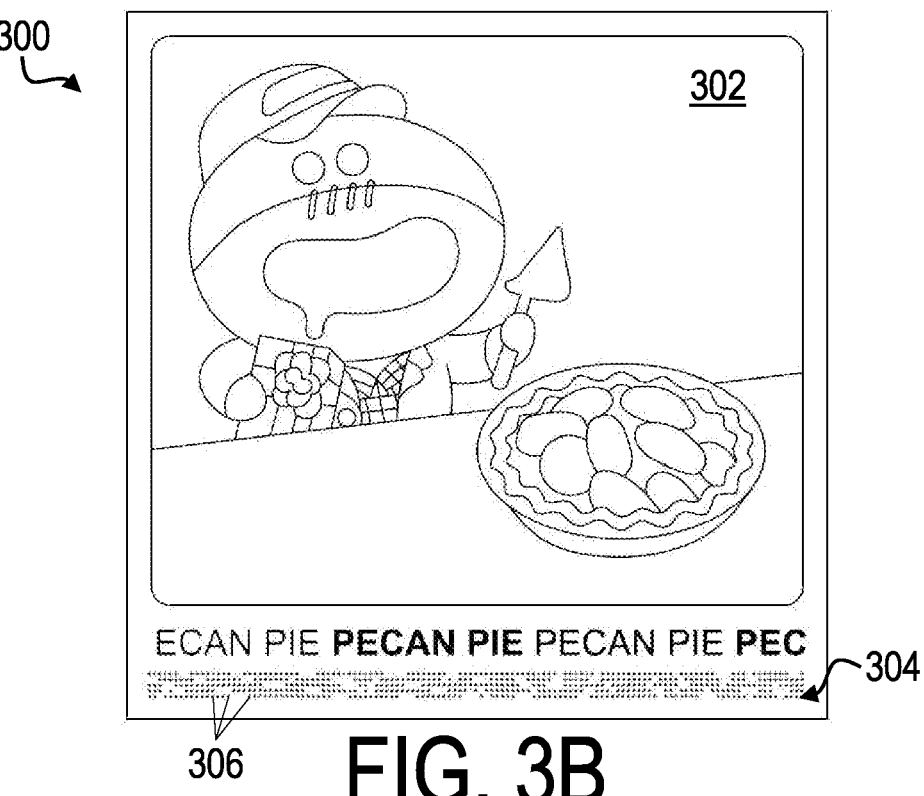

Referring now to FIGS. 3A and 3B, a digital asset 300 generated by the system 100 of FIG. 1 is depicted according to one non-limiting aspect of the present disclosure. According to the non-limiting aspect of FIGS. 3A and 3B, the digital asset can have at least one artistic component 302 and at least one non-artistic component 304. The artistic component 302 of the digital asset 300 can include, for example, an image, text, and/or an animation that the implementing user does not want to alter. The implementing user, for example, may not want to detract from the aesthetic qualities of the digital asset 300. However, the non-artistic component 304 can include any portion of the digital asset 300 that does not include artistic elements, such as an image, text, and/or an animation. It shall be appreciated that, according to some non-limiting aspects, the non-artistic component 304 may include a portion of an artistic element deemed inconsequential. For example, if the artistic component 302 of the digital asset 300 includes an artistic element, such as a picture, a portion of the background of the picture that does not include a subject of the picture may be deemed inconsequential and thus, treated as the non-artistic component 304 of the digital asset. However, according to other non-limiting aspects, information can be embedded within the artistic component 302 by altering pixel values that make up artistic component 302, itself.

In FIG. 3A, the digital asset 300 has not yet been altered by the system 100—and more specifically, the host server 104—of FIG. 1. However, according to the non-limiting aspect of FIG. 3B, the host server 104 has embedded with information within the digital asset 300, specifically within the non-artistic component 304 of the digital asset 300. As previously noted, the digital asset 300 can include a graphics interchange format that includes a plurality of pixel values defined via a finite color palette. For example, the graphics interchange format may support up to 8 bits (e.g, one byte) or more per pixel for each digital asset, allowing a single image to reference its own palette of up to 256 different colors or more chosen from a 24-bit RGB color space. Accordingly, the host server 104 (FIG. 1) can embed information into the digital asset by altering one or more pixel values of the plurality of pixel values. The host server 104 (FIG. 1), for example, can intentionally embed information into desired portions of the digital asset by exclusively altering pixel values that make up at least a portion of the non-artistic component 304. Conversely, the host server 104 (FIG. 1) can intentionally leave pixel values that make up artistic component 302 unaltered, thereby preserving the aesthetic integrity of the artistic component 302 and thus, the digital asset. Thus, by altering the pixel values that make up non-artistic component 304 and/or compressing the digital asset 300, the host server 104 (FIG. 1) can generate an altered version of the digital asset 300, as depicted in FIG. 3B.

In reference to FIG. 3B, the altered version of the digital asset 300 can include embedded information within the non-artistic component 304. According to the non-limiting aspect of FIG. 3B, the embedded information can be represented via a matrix of dots 306 within the non-artistic component 304 of the digital asset 300, which can be positioned below the artistic component 302 of the digital asset 300. However, it shall be appreciated that the layout of the digital asset 300 of FIGS. 3A and 3B is merely illustrative. As illustrated in reference to the digital asset 400 of FIGS. 4A and 4B, according to other non-limiting aspects, the non-artistic component 304 can be positioned anywhere relative to the artistic component 302, such as above the artistic component 302, around the artistic component 302, diagonal relative to the artistic component 302, and/or within the artistic component 302, itself. Additionally, it shall be appreciated that representing the embedded information via a matrix of dots 306 is merely illustrative and that the present disclosure contemplates other means of representing the embedded information. Information can be represented by any visual form of structured code. For example, according to some non-limiting aspects, embedded information within the digital asset 300 can include a quick response code, a bar code, or any other two-dimensional sequence of shapes defined by the altered pixel values of the digital asset 300, including abstract representations.

Figure 4A:
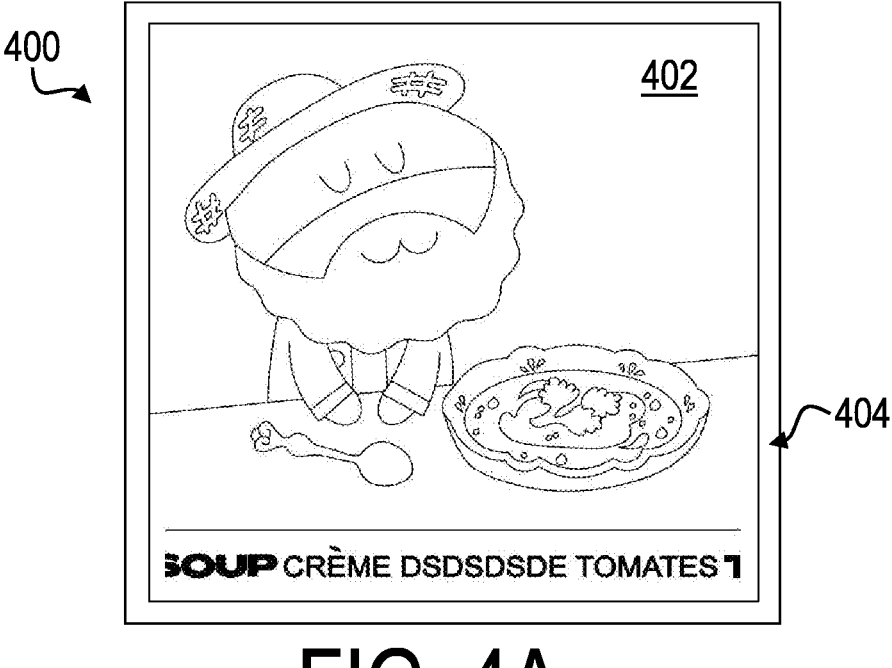
FIGS. 4A and 4B illustrate another digital asset generated by the system of FIG. 1, according to another non-limiting aspect of the present disclosure.
Figure 4B:
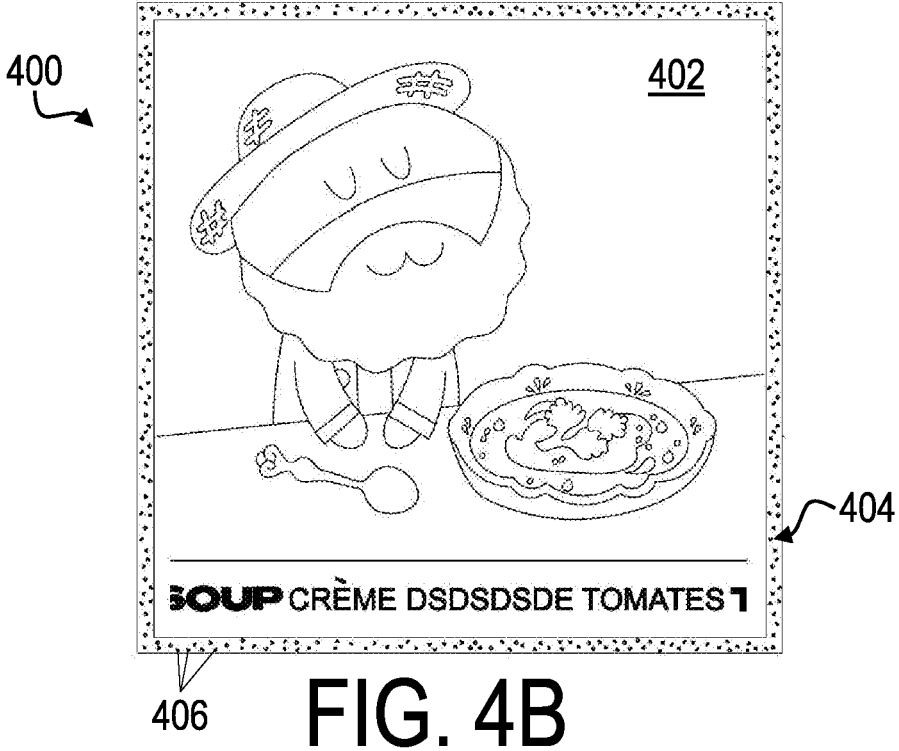

Referring now to FIGS. 4A and 4B, another digital asset 400 generated by the system 100 of FIG. 1 is depicted according to one non-limiting aspect of the present disclosure. As depicted in FIGS. 4A and 4B, the digital asset 400 can be similarly configured relative to the digital asset 300 of FIGS. 3A and 3B. However, unlike the digital asset 300 of FIGS. 3A and 3B, the non-artistic component 404 can be positioned around the artistic component 402. This illustrates how the non-artistic component 404 of a digital asset 400 can be positioned anywhere relative to the artistic component 402, such as above the artistic component 402, below the artistic component 402, diagonal relative to the artistic component 402, and/or within the artistic component 402, itself. Once again, there may not be an obvious non-artistic component 404 of the digital asset 400. For example, according to other non-limiting aspects, information can be embedded within the artistic component 402 by altering pixel values that make up artistic component 402, itself.

In FIG. 4A, the digital asset 400 has not yet been altered by the system 100—and more specifically, the host server 104—of FIG. 1. However, according to the non-limiting aspect of FIG. 4B, the host server 104 has embedded with information within the digital asset 400, specifically within the non-artistic component 404 of the digital asset 400. Once again, the digital asset 400 can include a graphics interchange format that includes a plurality of pixel values defined via a finite color palette. For example, the graphics interchange format format may support up to 8 bits (e.g, one byte) per pixel for each digital asset, allowing a single image to reference its own palette of up to 256 different colors chosen from a 24-bit RGB color space. Accordingly, the host server 104 (FIG. 1) can embed information into the digital asset by altering one or more pixel values of the plurality of pixel values. The host server 104 (FIG. 1), for example, can intentionally embed information into desired portions of the digital asset by exclusively altering pixel values that make up at least a portion of the non-artistic component 404. Conversely, the host server 104 (FIG. 1) can intentionally leave pixel values that make up artistic component 402 unaltered, thereby preserving the aesthetic integrity of the artistic component 402 and thus, the digital asset. Thus, by altering the pixel values that make up non-artistic component 404 and/or compressing the digital asset 400, the host server 104 (FIG. 1) can generate an altered version of the digital asset 400, as depicted in FIG. 4B.

In reference to FIG. 4B, the altered version of the digital asset 400 can include embedded information within the non-artistic component 404. According to the non-limiting aspect of FIG. 4B, the embedded information can be represented via a matrix of dots 406 within the non-artistic component 404 of the digital asset 400, which can be positioned below the artistic component 402 of the digital asset 400. Once again, it shall be appreciated that representing the embedded information via a matrix of dots 406 is merely illustrative and that the present disclosure contemplates other means of representing the embedded information. Information can be represented by any visual form of structured code. For example, according to some non-limiting aspects, embedded information within the digital asset 400 can include a quick response code, a bar code, or any other two-dimensional sequence of shapes defined by the altered pixel values of the digital asset 400, including abstract representations.

It shall be appreciated that, according to some non-limiting aspects, the digital assets 300, 400 of FIGS. 3A-4B can include a plurality of frames. Accordingly, either of the digital assets 300, 400 depicted in FIGS. 3A-4B may represent but a single frame of a plurality of frames that form the entire digital asset. For example, the digital assets 300, 400 may be animated, such that the plurality of frames can be dynamically displayed in succession. This predetermined sequence, or a sequence of frames, can produce an animated digital asset capable of carrying more embedded information. The animation can have a frame rate, or the speed at which the frames are dynamically displayed. A higher frame rate may produce a smoother, more aesthetic digital asset and can allow for more frames and thus, the inclusion of even more information. In such aspects, pixel values of at least one of the artistic feature of the artistic component 302, 402 or the representation 306 of embedded information within the non-artistic component 304, 304 may vary frame-by-frame. As such, as the plurality of frames are displayed in the predetermined sequence, at least one of the artistic feature of the artistic component 302, 402 or the representation 306 of embedded information within the non-artistic component 304, 304 appears to move when viewed by the consuming user 102 (FIG. 1). It shall be appreciated that such non-limiting aspects can be advantageous to the implementing user, because information can be embedded in each frame of the sequence of frames, such that the digital asset 300, 400 can contain more information, enabling more functionality for even more sophisticated applications. In other words, instead of a single frame with a single plurality of pixel values defined via a finite color palette, the digital assets 300, 400 can include multiple frames, each with its own plurality of pixel values defined via a finite color palette. Since the digital assets contemplated herein can support up to 8 bits (e.g, one byte) per pixel, multiple images can reference its own palette of up to 256 different colors chosen from a 24-bit RGB color space. This can provide the implementing user with an exponentially large number of pixels and pixel values to alter via the host server 104 (FIG. 1) and thus, enables much larger amount of information to be embedded within the digital assets 300, 400.

Figure 5:
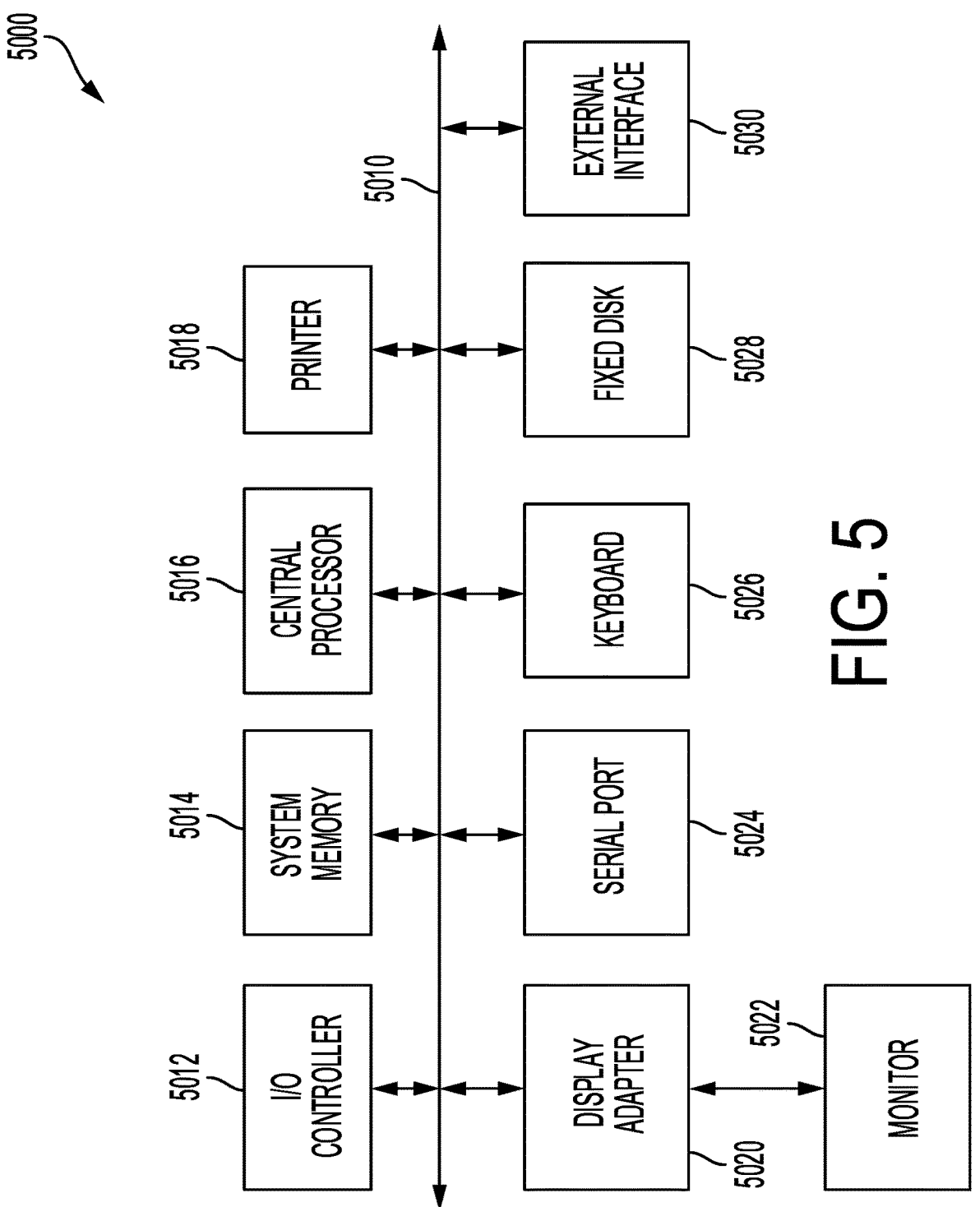
FIG. 5 illustrates a block diagram of a computer apparatus, according to at least one aspect of the present disclosure.

Referring now to FIG. 5, a block diagram of a computer apparatus 5000 with data processing subsystems or components, according to at least one aspect of the present disclosure. The subsystems shown in FIG. 5 are interconnected via a system bus 5010. Additional subsystems such as a printer 5018, keyboard 5026, fixed disk 5028 (or other memory comprising computer readable media), monitor 5022, which is coupled to a display adapter 5020, and others are shown. Peripherals and input/output (I/O) devices, which couple to an I/O controller 5012 (which can be a processor or other suitable controller), can be connected to the computer system by any number of means known in the art, such as a serial port 5024. For example, the serial port 5024 or external interface 5050 can be used to connect the computer apparatus to a wide area network such as the Internet, a mouse input device, or a scanner. The interconnection via system bus allows the central processor 5016 to communicate with each subsystem and to control the execution of instructions from system memory 5014 or the fixed disk 5028, as well as the exchange of information between subsystems. The system memory 5014 and/or the fixed disk 5028 may embody a computer readable medium.

Figure 6:
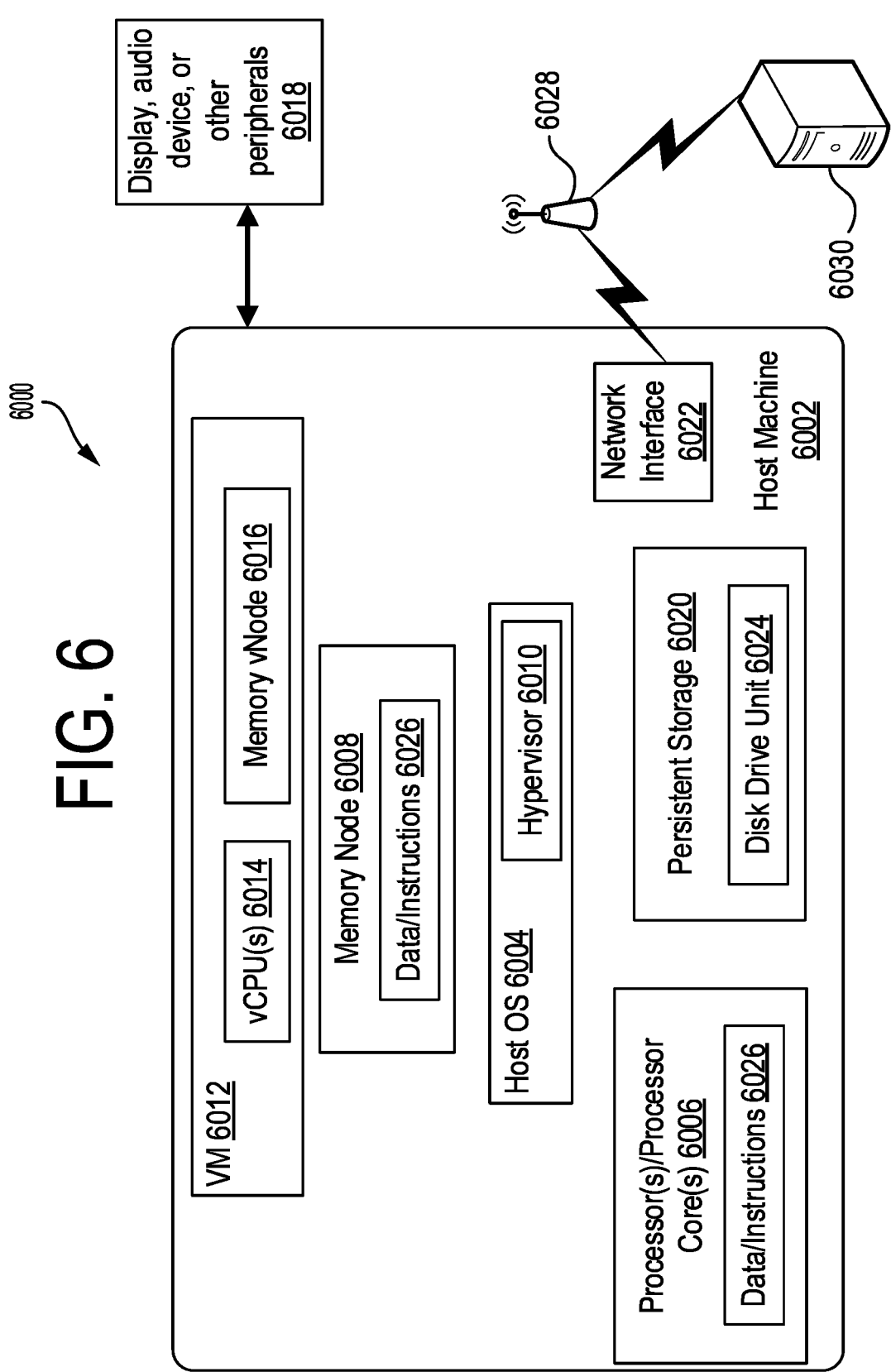
FIG. 6 illustrates a diagrammatic representation of an example system that includes a host machine within which a set of instructions to perform any one or more of the methodologies discussed herein may be executed, according to at least one aspect of the present disclosure.

Referring now to FIG. 6, a diagrammatic representation of an example system 6000 that includes a host machine 6002 within which a set of instructions to perform any one or more of the methodologies discussed herein may be executed, according to at least one aspect of the present disclosure. In various aspects, the host machine 6002 operates as a standalone device or may be connected (e.g., networked) to other machines. In a networked deployment, the host machine 6002 may operate in the capacity of a server or a client machine in a server-client network environment, or as a peer machine in a peer-to-peer (or distributed) network environment. The host machine 6002 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 6000 includes the host machine 6002, running a host operating system (OS) 6004 on a processor or multiple processor(s)/processor core(s) 6006 (e.g., a central processing unit (CPU), a graphics processing unit (GPU), or both), and various memory nodes 6008. The host OS 6004 may include a hypervisor 6010 which is able to control the functions and/or communicate with a virtual machine ("VM") 6012 running on machine readable media. The VM 6012 also may include a virtual CPU or vCPU 6014. The memory nodes 6008 may be linked or pinned to virtual memory nodes or vNodes 6016. When the memory node 6008 is linked or pinned to a corresponding vNode 6016, then data may be mapped directly from the memory nodes 6008 to the corresponding vNode 6016.

All the various components shown in host machine 6002 may be connected with and to each other, or communicate to each other via a bus (not shown) or via other coupling or communication channels or mechanisms. The host machine 6002 may further include a video display, audio device or other peripherals 6018 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker) a persistent storage device 6020 (also referred to as disk drive unit), and a network interface device 6022. The host machine 6002 may further include a data encryption module (not shown) to encrypt data. The components provided in the host machine 6002 are those typically found in computer systems that may be suitable for use with aspects of the present disclosure and are intended to represent a broad category of such computer components that are known in the art. Thus, the system 6000 can be a server, minicomputer, mainframe computer, or any other computer system. The computer may also include different bus configurations, networked platforms, multiprocessor platforms, and the like. Various operating systems may be used including UNIX, LINUX, WINDOWS, QNX ANDROID, IOS, CHROME, TIZEN, and other suitable operating systems.

The disk drive unit 6024 also may be a Solid-state Drive (SSD), a hard disk drive (HDD) or other includes a computer or machine-readable medium on which is stored one or more sets of instructions and data structures (e.g., data/instructions 6026) embodying or utilizing any one or more of the methodologies or functions described herein. The data/instructions 6026 also may reside, completely or at least partially, within the main memory node 6008 and/or within the processor(s) 6006 during execution thereof by the host machine 6002. The data/instructions 6026 may further be transmitted or received over a network 6028 via the network interface device 6022 utilizing any one of several well-known transfer protocols (e.g., Hyper Text Transfer Protocol (HTTP)).

The processor(s) 6006 and memory nodes 6008 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 6002 and that causes the host machine 6002 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 6002, with each server 6030 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Referring now to FIG. 7, a logic flow diagram of a method 700 of efficiently encrypting information into a dynamic, digital asset is depicted in accordance with at least one non-limiting aspect of the present disclosure. For example, the method 700 can be performed by any of the systems or system components disclosed herein, including the system 100 of FIG. 1, the computer apparatus 5000 of FIG. 5, or the system 6000 of FIG. 6. The host server 104 (FIG. 1), may include a computer apparatus 5000 (FIG. 5) or system 6000 (FIG. 6), for example. Either the computer apparatus 5000 (FIG. 5) or the system 6000 (FIG. 6) can include a memory configured to store instructions that, when executed by a processor, cause the host server 104 (FIG. 1) to perform the method 700 of FIG. 7.

According to the non-limiting aspect of FIG. 7, the method 700 can include receiving 702 a digital asset from a computer network, wherein the digital asset comprises a plurality of pixel values. As previously described, according to some non-limiting aspects, the method 700 can further include encrypting 706 the information via an encryption algorithm prior to embedding the information within the unaltered digital asset. Regardless of whether or not the information is encrypted, the method 700 can further include embedding 704 information within the digital asset by altering the plurality of pixel values. The embedding 704 process, for example, can be algorithmically implemented in accordance with the techniques disclosed in reference to FIGS. 8A and 8B. Upon embedding 704 the information within the digital asset, the method 700 can further include compressing 708 the digital asset with the embedded information. The compression may be accomplished via known techniques. For example, the method 700 can employ a Lempel-Ziv-Welch compression or zip compression techniques, which are lossless. According to some non-limiting aspects, the file size of the altered digital asset is—at most—the same as the file size of the original digital asset, in spite of the inclusion of the embedded information. As previously explained, this can be attributed to a finite color palette of the digital asset, which can be provided via a graphics interchange format. The method 700, therefore, can further include generating 710 an altered digital asset based on the compressed digital asset with the embedded information. This can include minting the digital asset to a computer network 107 (FIGS. 1 and 2), such that the altered digital asset is associated with a non-fungible token managed by a digital ledger 210 (FIG. 2), for example.

Figure 8B:
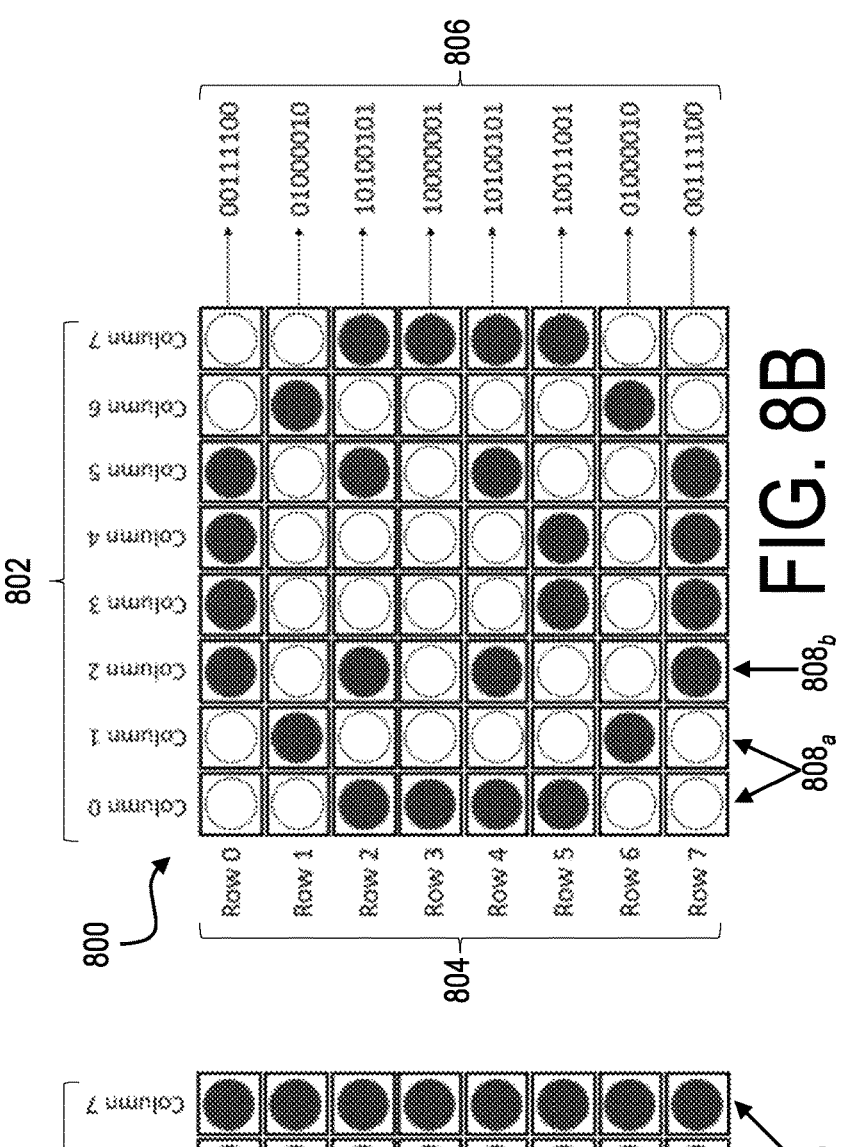
FIGS. 8A and 8B illustrate an algorithmic technique of embedding information within a digital asset, according to at least one non-limiting aspect of the present disclosure.
Figure 8A:
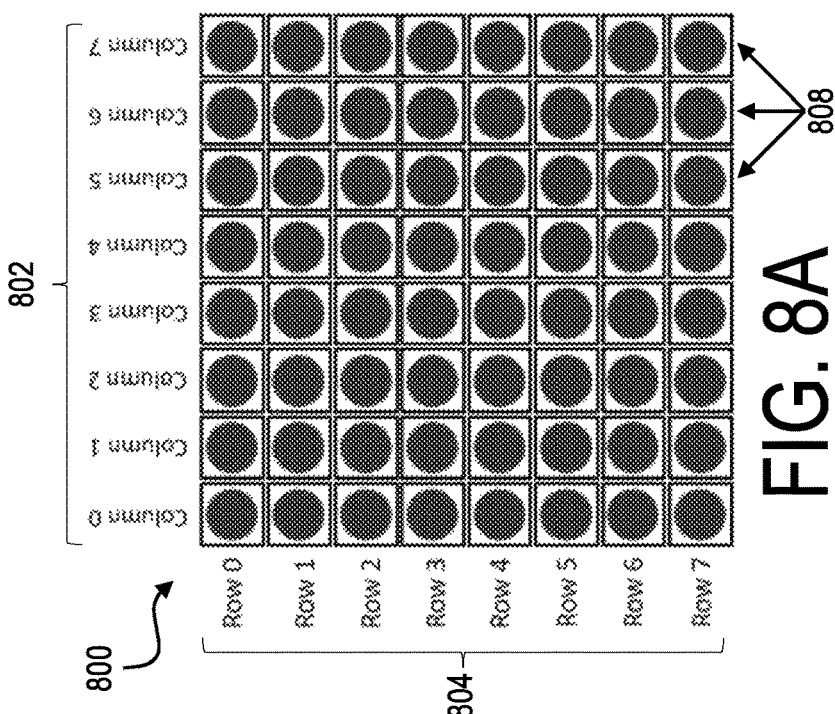

Referring now to FIGS. 8A and 8B, an algorithmic technique of embedding information within a digital asset is depicted according to at least one non-limiting aspect of the present disclosure. According to the non-limiting aspect of FIG. 8A, the digital asset can be composed of a plurality of pixels 808, wherein each pixel 808 includes a pixel value, wherein each pixel value is associated with one of the 256 colors of the finite color palette. The pixels 808 can be arranged in a plurality of columns 802 and rows 804. In FIG. 8A, the plurality of pixels 808 are unaltered, meaning each pixel 808 has an original pixel value. The color palette can be defined via metadata in an original, unaltered digital asset, which can be used by the devices, systems, and methods disclosed herein as a "codebook."

However, according to the non-limiting aspect of FIG. 8B, at least some of the pixels 808a of the plurality of pixels 800 have been altered, meaning, they no longer have their original pixel value, as depicted in FIG. 8A. According to the non-limiting aspect of FIG. 8B, certain pixels 808a have been intentionally altered such that each row 804 can function as a binary sequence 806 interpretable by a computing device 101 (FIG. 1) upon detection or receipt. In other words, each pixel 800 of the plurality of pixels 800 represents one byte of information and, collectively, can be utilized to imbue the altered digital asset with the enhanced functionality disclosed herein. It shall be appreciated that the algorithmic technique of FIGS. 8A and 8B is overly simplistic for illustrative purposes and that, according to some non-limiting aspects, a digital asset can have large quantities of pixels 800 that can be altered to embed the digital asset with a large quantity of information. The quantity of information embedded within the digital asset can be increased by generating a digital asset that includes a sequence of frames, because each frame of the sequence can be embedded with information using the same technique described in reference to FIGS. 8A and 8B.

Examples of the method according to various aspects of the present disclosure are provided below in the following numbered clauses. An aspect of the method may include any one or more than one, and any combination of, the numbered clauses described below.

Clause 1. A computer-implemented method of embedding information within a digital asset, the method including receiving, via a host server, a digital asset from a computer network, wherein the digital asset includes a plurality of pixel values, embedding, via the host server, information within the digital asset by altering the plurality of pixel values, compressing, via the host server, the digital asset with the embedded information, and generating, via the host server, an altered digital asset based on the compressed digital asset with the embedded information, wherein, upon detection of the altered digital asset, an application stored in a memory of a computing device causes a processor of the computing device to retrieve the embedded information from the altered digital asset.

Clause 2. The computer-implemented method according to clause 1, wherein the the digital asset includes an original color palette, and wherein altering the plurality of pixel values utilizes the original color palette of the digital asset such that a file size of the digital asset is the same as a file size of the altered digital asset.

Clause 3. The computer-implemented method according to either of clauses 1 or 2, wherein the original color palette of the digital asset defines a codebook, and wherein retrieval of the embedded information from the altered digital asset is based on the codebook defined by the original color palette of the digital asset.

Clause 4. The computer-implemented method according to any of clauses 1-3, wherein altering the plurality of pixel values further includes altering pixel values of the plurality of pixel values located at predetermined coordinates.

Clause 5. The computer-implemented method according to any of clauses 1-4, wherein the unaltered digital asset includes an artistic component, and wherein the pixel values located at the predetermined coordinates do not overlap with the artistic component.

Clause 6. The computer-implemented method according to any of clauses 1-5, further including encrypting, via the host server, the information via an encryption algorithm prior to embedding the information within the unaltered digital asset.

Clause 7. The computer-implemented method according to any of clauses 1-6, wherein retrieval of the embedded information from the altered digital asset includes decrypting the encrypted information via an encryption key stored on the computing device.

Clause 8. The computer-implemented method according to any of clauses 1-7, wherein the unaltered digital asset includes a sequence of frames.

Clause 9. The computer-implemented method according to any of clauses 1-8, wherein the sequence of frames is dynamically displayed in succession according to a predetermined frame rate of the unaltered digital asset.

Clause 10. The computer-implemented method according to any of clauses 1-9, wherein each frame of the sequence of frames includes a subset of the plurality of pixel values, and wherein altering the plurality of pixel values includes altering the subset of the plurality of pixel values of each frame of the sequence of frames.

Clause 11. The computer-implemented method according to any of clauses 1-10, wherein the information embedded within the digital asset causes the application perform a predetermined action upon retrieval.

Clause 12. The computer-implemented method according to any of clauses 1-11, wherein the digital asset includes a video game asset, including at least one of a model, a visual appearance, or a gaming attribute of the video game asset, and wherein the predetermined action includes unlocking the video game asset upon retrieval of the information embedded within the digital asset.

Clause 13. The computer-implemented method according to any of clauses 1-12, wherein the digital asset includes an image file associated with a musical composition, and wherein the predetermined action includes playing an audio file associated with the musical composition upon retrieval of the information embedded within the digital asset.

Clause 14. The computer-implemented method according to any of clauses 1-13, wherein the digital asset includes an image file of food, and wherein the predetermined action includes displaying a recipe associated with the food upon retrieval of the information embedded within the digital asset.

Clause 15. The computer-implemented method according to any of clauses 1-14, wherein the digital asset is associated with a generative artificial intelligence, and wherein the predetermined action includes interacting with the generative artificial intelligence upon retrieval of the information embedded within the digital asset.

Clause 16. The computer-implemented method according to any of clauses 1-15, wherein the computer network includes a blockchain network, and wherein the digital asset includes a non-fungible token.

Clause 17.A system for embedding information within a digital asset, the system including a computing device including a processor and a memory that stores an application, and a host server including a processor and a memory to store instructions that, when executed by the processor, cause the host server to receive a digital asset from a computer network, wherein the digital asset includes a plurality of pixel values, embed information within the digital asset by altering the plurality of pixel values, compress the digital asset with the embedded information, and generate an altered digital asset based on the compressed digital asset with the embedded information, wherein, upon detection of the altered digital asset, the application causes the processor of the computing device to retrieve the embedded information from the altered digital asset upon receipt.

Clause 18.A computer-implemented method of utilizing information embedded within a digital asset, the method including receiving a digital asset from a computer network, wherein the digital asset includes a plurality of pixel values, detecting, via a computing device, that at least a subset of the plurality of pixel values that has been altered, comparing, via the computing device, the subset of the plurality of pixel values that has been altered to a codebook associated with an original color palette of the digital asset, extracting, via the computing device, embedded information from the digital asset based on the comparison of the subset of the plurality of pixel values to the codebook, and executing, via the computing device, a predetermined action based on the embedded information extracted from the digital asset.

Clause 19. The method according to clause 18, wherein the digital asset includes an image of a video game asset, and wherein the predetermined action includes unlocking, via the computing device, the video game asset for use via an application executed by the computing device.

Clause 20. The method according to either of clauses 18 or 19, wherein the digital asset includes an image file associated with a musical composition, and wherein the predetermined action includes playing, via the computing device, an audio file associated with the musical composition.

Clause 21. The method according to any of clauses 18-20, wherein the digital asset is associated with a generative artificial intelligence, and wherein the predetermined action includes an interaction with the generative artificial intelligence.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A computer-implemented method of embedding information within a digital asset, the method comprising:
receiving, via a host server, a digital asset from a computer network, wherein the digital asset comprises a graphics interchange format comprising a plurality of pixel values associated with an original color palette of the digital asset;
embedding, via the host server, information within the digital asset by altering the plurality of pixel values without altering the original color palette of the digital asset in spite of a compression of the digital asset; and
generating, via the host server, an altered digital asset comprising the embedded information, wherein the altered digital asset has been compressed but the original color palette of the digital asset remains unaltered, wherein the altered, compressed digital asset comprises a file size less than or equal to an original file size of the digital asset even though the altered, compressed digital asset comprises the embedded information, and wherein, upon detection of the altered digital asset, an application stored in a memory of a computing device causes a processor of the computing device to retrieve the embedded information from the altered digital asset.

2. The computer-implemented method of claim 1, wherein the digital asset comprises an original color palette, and wherein altering the plurality of pixel values utilizes the original color palette of the digital asset such that a file size of the digital asset is the same as a file size of the altered digital asset.

3. The computer-implemented method of claim 2, wherein the original color palette of the digital asset defines a codebook, and wherein retrieval of the embedded information from the altered digital asset is based on the codebook defined by the original color palette of the digital asset.

4. The computer-implemented method of claim 3, wherein altering the plurality of pixel values further comprises altering pixel values of the plurality of pixel values located at predetermined coordinates.

5. The computer-implemented method of claim 4, wherein the digital asset comprises an artistic component, and wherein the pixel values located at the predetermined coordinates do not overlap with the artistic component.

6. The computer-implemented method of claim 2, further comprising encrypting, via the host server, the information via an encryption algorithm prior to embedding the information within the digital asset.

7. The computer-implemented method of claim 6, wherein retrieval of the embedded information from the altered digital asset comprises decrypting the encrypted information via an encryption key stored on the computing device.

8. The computer-implemented method of claim 2, wherein the digital asset comprises a sequence of frames.

9. The computer-implemented method of claim 8, wherein the sequence of frames is dynamically displayed in succession according to a predetermined frame rate of the digital asset.

10. The computer-implemented method of claim 9, wherein each frame of the sequence of frames comprises a subset of the plurality of pixel values, and wherein altering the plurality of pixel values comprises altering the subset of the plurality of pixel values of each frame of the sequence of frames.

11. The computer-implemented method of claim 2, wherein the information embedded within the digital asset causes the application to perform a predetermined action upon retrieval.

12. The computer-implemented method of claim 11, wherein the digital asset comprises a video game asset comprising at least one of a model, a visual appearance, or a gaming attribute of the video game asset, or combinations thereof, and wherein the predetermined action comprises unlocking the video game asset upon retrieval of the information embedded within the digital asset.

13. The computer-implemented method of claim 11, wherein the digital asset comprises an image file associated with a musical composition, and wherein the predetermined action comprises playing an audio file associated with the musical composition upon retrieval of the information embedded within the digital asset.

14. The computer-implemented method of claim 11, wherein the digital asset comprises an image file of food, and wherein the predetermined action comprises displaying a recipe associated with the food upon retrieval of the information embedded within the digital asset.

15. The computer-implemented method of claim 11, wherein the digital asset is associated with a generative artificial intelligence, and wherein the predetermined action comprises interacting with the generative artificial intelligence upon retrieval of the information embedded within the digital asset.

16. The computer-implemented method of claim 1, wherein the computer network comprises a blockchain network, and wherein the digital asset comprises a non-fungible token.

17. The computer-implemented method of claim 1, wherein the file size of the altered, compressed digital asset being less than or equal to the digital asset is attributed to a finite color palette of the digital asset.

18. A system for embedding information within a digital asset, the system comprising:

a computing device comprising a processor and a memory that stores an application; and a host server comprising a processor and a memory to store instructions that, when executed by the processor, cause the host server to:

receive a digital asset from a computer network, wherein the digital asset is animated and comprises a plurality of pixel values associated with an original color palette of the digital asset;

embed information within the digital asset by altering the plurality of pixel values without altering the original color palette of the digital asset in spite of a compression of the digital asset, wherein the altered, compressed digital asset comprises a file size less than or equal to an original file size of the digital asset even though the altered, compressed digital asset comprises the embedded information; and generate an altered digital asset comprising the embedded information, wherein the altered digital asset has been compressed but the original color palette of the digital asset remains unaltered, and wherein, upon detection of the altered digital asset, the application causes the processor of the computing device to perform a predetermined action based on the embedded information from the altered digital asset upon receipt.

\* \* \* \* \*